（12) United States Patent
Kamble

(10) Patent No.: US 9,409,791 B2
(45) Date of Patent: Aug. 9, 2016

(54) PHOTOCATALYTIC DEGRADATION OF PHARMACEUTICAL DRUGS AND DYES USING VISIBLE ACTIVE BIOX PHOTOCATALYST

(71) Applicant: Council of Scientific & Industrial Research, New Delhi (IN)

(72) Inventor: Sanjay Pandurang Kamble, Pune (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 14/584,168

(22) Filed: Dec. 29, 2014

(65) Prior Publication Data

US 2016/0185615 A1    Jun. 30, 2016

(51) Int. Cl.

| | | |
|---|---|---|
| *B01J 23/18* | (2006.01) | |
| *B01J 27/02* | (2006.01) | |
| *C01G 29/00* | (2006.01) | |
| *B01J 27/186* | (2006.01) | |
| *B01J 27/04* | (2006.01) | |
| *B01J 35/02* | (2006.01) | |
| *B01J 35/10* | (2006.01) | |

(Continued)

(52) U.S. Cl.
CPC ............... *C01G 29/00* (2013.01); *B01J 27/04* (2013.01); *B01J 27/186* (2013.01); *B01J 35/004* (2013.01); *B01J 35/026* (2013.01); *B01J 35/1019* (2013.01); *B01J 35/1038* (2013.01); *B01J 35/1061* (2013.01); *B01J 37/04* (2013.01); *B01J 37/08* (2013.01); *B01J 37/343* (2013.01); *C02F 1/30* (2013.01); *C02F 1/725* (2013.01); *C02F 2101/30* (2013.01);
*C02F 2101/308* (2013.01); *C02F 2101/34* (2013.01); *C02F 2101/36* (2013.01); *C02F 2305/10* (2013.01)

(58) Field of Classification Search
CPC ........ B01J 23/18; B01J 27/02; B01J 27/1815; B01J 35/004; B01J 35/023; B01J 35/1019; B01J 37/00; B01J 37/04; B01J 37/08; C02F 1/725; C02F 2101/308; C02F 2305/10
USPC ........................................ 502/208, 216, 353
See application file for complete search history.

(56) References Cited

U.S. PATENT DOCUMENTS 5,977,416 A * 11/1999 Matsuzaki ............... B01J 23/18
568/360
2007/0138459 A1* 6/2007 Wong ..................... B82Y 25/00
257/9

(Continued)

FOREIGN PATENT DOCUMENTS

CN 103752332 4/2014

OTHER PUBLICATIONS

"Photodegradation of organic dyes in the presence of [Fe(III)-salen]Cl complex and H2O2 under visible light irradiation," Sarifuddin Gazi et al. Journal of Hazardous Materials 183 (2010), pp. 894-901.*

(Continued)

*Primary Examiner* — Patricia L Hailey
(74) *Attorney, Agent, or Firm* — Lerner, David, Littenberg, Krumholz & Mentlik, LLP

(57) ABSTRACT

Provided is a visible active photocatalyst of formula BiOX wherein X=P or S and process of preparation and use thereof. Use of the catalyst is demonstrated in the photocatalytic degradation of pharmaceutical drug pollutants and pollutant dyes using solar radiation or artificial radiation.

17 Claims, 8 Drawing Sheets

(a)

(b)

(c)

(51) Int. Cl.
*B01J 37/04* (2006.01)
*B01J 37/34* (2006.01)
*B01J 37/08* (2006.01)
*B01J 35/00* (2006.01)
*C02F 1/30* (2006.01)
*C02F 1/72* (2006.01)
*C02F 101/30* (2006.01)
*C02F 101/34* (2006.01)
*C02F 101/36* (2006.01)

(56) References Cited

U.S. PATENT DOCUMENTS

| | | | | |
|---|---|---|---|---|
| 2011/0180423 | A1* | 7/2011 | Barry | A01K 63/04 205/742 |
| 2013/0180932 | A1* | 7/2013 | Fukumura | B01J 27/24 210/749 |
| 2014/0011666 | A1* | 1/2014 | Yoshizaki | A23L 1/304 502/7 |

OTHER PUBLICATIONS

"Adsorptional photocatalytic degradation of methylene blue onto pectin-CuS nanocomposite under solar light," Vinod Kumar Gupta et al. Journal of Hazardous Materials 243 (2012), pp. 179-186.*

"Investigation of dye functional group on the photocatalytic degradation of dyes by nano-$TiO_2$," R. Vinu et al. Journal of Hazardous Materials 176 (2010), pp. 765-773.*

Chen et al., "Photocatalytic study of BiOCl for degradation of organic pollutants under UV irradiation", Journal of Photochemistry and Photobiology A: Chemistry 215 (2010) 76-80.

El-Kemary et al., "Photocatalytic degradation of ciprofloxacin drug in water using ZnO nanoparticles", Journal of Luminescence 130 (2010) 2327-2331.

Gad-Allah et al., "Photocatalytic oxidation of ciprofloxacin under simulated sunlight", Journal of Hazardous Material 186 (2011) 751-755.

Sun et al., "Degradation of Antibiotic Ciprofloxacin Hydrochloride by Photo-Fenton Oxidation Process", Environmental Engineering Science, vol. 26, No. 4, 2009, pp. 753-759.

Wang et al., "A highly efficient visible-light-activated photocatalyst based on bismuth-and-sulfur-codoped $TiO_2$", J. Phys. Chem. C 2008, 112, 6620-6626.

Yang et al., "Microwave-assisted in situ synthesis of reduced graphene oxide-$BiVO_4$ composite photocatalyst and their enhanced photocatalyst performance for the degradation of ciprofloxacin", Journal of Hazardous Materials 250-251 (2013) 106-114.

* cited by examiner

PHOTOCATALYTIC DEGRADATION OF PHARMACEUTICAL DRUGS AND DYES USING VISIBLE ACTIVE BIOX PHOTOCATALYST

FIELD OF THE INVENTION

The present invention relates to a photocatalyst that is active in the visible-light and UV portions of the electromagnetic spectrum, referred to hereinafter as a "visible active photocatalyst" and which is of the formula BiOX wherein X=P or S and process of preparation thereof. More particularly, the present invention relates to a visible active photocatalyst of formula BiOX wherein X=P or S and its application for photocatalytic degradation of pollutant pharmaceuticals drugs or dyes present in wastewater.

BACKGROUND

Pollution of water due to pharmaceuticals is an international problem, many compounds in this category are highly refractory resulting conventional wastewater treatment plants are inefficient. Fluoroquinolones (FQs) are one of the classes of broad spectrum antibiotics that are commonly used in both human and veterinary medicine. They inhibit key bacterial enzymes, such as DNA gyrase and topoisomerase IV, that are involved with unwinding the DNA helix for replication and transcription. Ciprofloxacin hydrochloride (CFX), a second generation FQ and one of the most prescribed drugs in the world, and it has been regularly found in wastewater at nanograms levels that could induce bacterial resistance. Ciprofloxacin hydrochloride is a broad spectrum antibiotic that is effective against gram-positive and gram-negative bacteria. It was recommended during the anthrax outbreak in 2001 and has also been used to target biological agents of Legionnaire's disease and typhoid. It also belongs to a class of powerful FQs that have been linked to serious side effects which include ruptured tendons and neurological damage resulting from seizures. The pharmaceutical compounds are often hardly biodegradable, resulting in inefficient removal by conventional wastewater treatment plants (WWTP). Therefore, Ciprofloxacin hydrochloride must be removed to a permissible level from the wastewater before being discharged into drainage system. A number of promising wastewater treatment methods have been used to remove Ciprofloxacin hydrochloride from wastewater such as ozonation, photo Fenton; sonolysis, photolysis and titanium dioxide ($TiO_2$) photocatalytic degradation have been recently applied for the remediation of FQs. Using photocatalyst, an inexpensive and safe semiconductor as photo-oxidant, is an appealing possibility in the perspective of green chemistry, because it is active under natural solar radiation. $TiO_2$ has been extensively employed for the remediation of pollutants. However there are few drawbacks associated with $TiO_2$ including: (i) it has very low surface area (55 $m^2/g$ for Degussa P-25 $TiO_2$) and (ii) low porosity and it can be activated only by irradiating with ultraviolet light (wide band gap energies, 3.0 eV for rutile and 3.2 eV for anatase) which is around 4-8% of solar radiation that reaches the earth surface. It is therefore of utmost importance to develop an improved visible active photocatalyst.

Article titled "Photocatalytic study of BiOCl for degradation of organic pollutants under UV irradiation" by F Chen et al. published in Journal of Photochemistry and Photobiology A: Chemistry, Volume 215, Issue 1, 5 Sep. 2010, Pages 76-80 reports Photocatalytic study of BiOCl as BiOCl exhibited high photocatalytic activities for the degradation of rhodamine B, methyl orange and phenol. Surface chloride ions were adverse to the BiOCl photocatalysis and dissociated from BiOCl via reaction with photogenerated holes and electrons under UV irradiation. Conduction band electrons of BiOCl directly reduced either chlorine radical or the azo-bond of MO during the photocatalytic process. Hydroxyl radical was the main oxidative species in the BiOCl photocatalysis, whose generation can be accelerated via enhancing the conduction band electron consumption by MO. After the photocatalytic reaction, the dissolved chloride ion would spontaneously recombine back to the BiOCl photocatalyst, hence qualifies BiOCl as a practical high-activity photocatalyst with long lifetime.

Article titled "Photocatalytic degradation of ciprofloxacin drug in water using ZnO nanoparticles" by M El-Kemary et al. published in Journal of Luminescence, Volume 130, Issue 12, December 2010, Pages 2327-2331 reports the synthesis of nanostructure ZnO semiconductor with ~2.1 nm diameter using a chemical precipitation method. The resulting nanoparticles were characterized by X-ray diffraction analysis (XRD), Fourier-transform infrared (FT-IR) spectroscopy, scanning electron microscopy (SEM) and transmission electron microscopy (TEM). The optical properties were investigated by UV-vis and fluorescence techniques. The absorption spectra exhibit a sharp absorption edge at ~334 nm corresponding to band gap of ~3.7 eV. The fluorescence spectra displayed a near-band-edge ultraviolet excitonic emission at ~410 nm and a green emission peak at ~525 nm, due to a transition of a photo-generated electron from the conduction band to a deeply trapped hole. The photocatalytic activity of the prepared ZnO nanoparticles has been investigated for the degradation of ciprofloxacin drug under UV light irradiation in aqueous solutions of different pH values. The results showed that the photocatalytic degradation process is effective at pH 7 and 10, but it is rather slow at pH 4. Higher degradation efficiency (~50%) of the drug was observed at pH 10 after 60 min. photodegradation of the drug follows a pseudo-first-order kinetics.

Article titled "A Highly Efficient Visible-Light-Activated Photocatalyst Based on Bismuth- and Sulfur-co-doped $TiO_2$" by Y Wang et al. published in J. Phys. Chem. C, 2008, 112 (17), pp 6620-6626 reports titanium dioxide ($TiO_2$) codoped with bismuth (Bi) and sulfur (S) elements was prepared by a simple sol-gel method using tetrabutyl titanate, bismuth nitrate pentahydrate, and thiourea as precursors. The codoped $TiO_2$ calcined at 400° C. exhibits an intense absorption in the range of 500-800 nm. The absorption edge corresponds to a band gap of 2.0 eV. An indigo carmine solution of 20 mg/L was completely photodegraded in 40 min in the presence of such photocatalyst under visible light ($\lambda$>410 nm). This highly active photocatalytic performance is associated with the existence of numerous oxygen vacancies, the acidic sites on the surface of $TiO_2$, and the high specific surface area.

Article titled "Degradation of antibiotic ciprofloxacin hydrochloride by photo-fenton oxidation process" by S ShengPeng et al. published in Environmental Engineering Science, 2009, 26 (4), pp. 753-759 reports the feasibility of using a photo-Fenton oxidation process for the degradation of ciprofloxacin hydrochloride. The pH value of solutions, dosages of hydrogen peroxide and ferrous ion, reaction temperature, and the presence of chloride ion, which affect the degradation of ciprofloxacin hydrochloride wastewater, were studied based on the changes of ciprofloxacin hydrochloride concentration and UV-absorbance of the wastewater. Results indicated that ciprofloxacin hydrochloride could be degraded effectively by photo-Fenton oxidation process in a wide pH range of 3.0 to 5.0; the optimum dosages of hydrogen peroxide and ferrous ion were selected as 5.0 and 0.05 mmol $L^{-1}$, respectively; the increase of reaction temperature had a positive effect, but the presence of chloride ion had an inhibitory one on the degradation of ciprofloxacin hydrochloride. Under optimum conditions of $C_0$=15 mg $L^{-1}$, $[H_2O_2]$=5.0 mmol $L^{-1}$, $[Fe2+]$=0.05 mmol $L^{-1}$, pH 4.0 and 25° C., no ciprofloxacin hydrochloride was detected in the 45-min reaction time. Degradation kinetics of ciprofloxacin hydrochloride by a photo-Fenton oxidation process follows the first-order reaction kinetics model. The photo-Fenton oxidation process was more rapid and effective for the degradation of ciprofloxacin hydrochloride than conventional Fenton process. It is feasible to employ the photo-Fenton oxidation process to treat ciprofloxacin hydrochloride wastewater; the process also provides an effective approach for other antibiotics wastewater treatment.

Article titled "Photocatalytic oxidation of ciprofloxacin under simulated sunlight" by TA Gad-Allah et al. Published in J Hazard Mater., 2011 Feb. 15, 186(1), 751-5 reports photocatalytic degradation of ciprofloxacin using commercial anatase titanium dioxide ($TiO_2$) under simulated sunlight. The rate of reaction was found to be affected by pH, $TiO_2$ concentration and antibiotic concentration. The best reaction rate was obtained in natural ciprofloxacin pH (5.8) and 1000 mg/L $TiO_2$. More titania concentration was found to reduce the reaction rate because of the limitation in light transmittance. From kinetic studies, the reaction was proved to proceed through adsorption step then photooxidation and obeys pseudo-first order kinetics.

Article titled "Microwave-assisted in situ synthesis of reduced graphene oxide-$BiVO_4$ composite photocatalysts and their enhanced photocatalytic performance for the degradation of ciprofloxacin" by Y Yan et al. published in J Hazard Mater., 2013 Apr. 15, 250-251, 106-14 reports a new-type microwave-assisted in situ growth method is developed for the preparation of reduced graphene oxide (RGO)-$BiVO_4$ composite photocatalysts. The as-produced RGO-$BiVO_4$ composite photocatalysts show extremely high enhancement of CIP degradation ratio over the pure $BiVO_4$ photocatalyst under visible light. Specially, the 2 wt % RGO-$BiVO_4$ composite photocatalyst exhibits the highest CIP degradation ratio (68.2%) in 60 min, which is over 3 times than that (22.7%) of the pure $BiVO_4$ particles. The enhancement of photocatalytic activities of RGO-$BiVO_4$ photocatalysts can be attributed to the effective separation of electron-hole pairs rather than the improvement of light absorption.

Chinese patent application no. CN103752332A reports a dried persimmon-shaped visible-light-driven photocatalyst BiOBr and a preparation method thereof. The inventor adopts a low-temperature solvothermal method, controls the morphology of a halogen-bismuth-oxide visible-light-driven photocatalyst by controlling the dosage of a bismuth source and a bromine source and adding a structure guiding agent, and successfully prepares the novel efficient visible-light-driven photocatalyst BiOBr with novel and special morphology, the dried persimmon shape. The visible-light-driven photocatalyst disclosed by the invention has good visible-light catalytic activity, can completely degrade a plurality of organic pollutants (such as methylthionine chloride and methyl orange) within a short period of time under irradiation of visible light, is small in light corrosivity, good in reusability and large in market potential, can be applied to industrial production, and especially has good application value in photocatalytic decomposition of organic pollutants by solar energy.

Therefore, there is need in the art to develop a cost effective, recyclable, pollution free and environmentally friendly process for photocatalytic degradation (PCD) of pharmaceutical drugs including, for example, ciprofloxacin hydrochloride (CFX), naproxen or dyes including, for example, orange dye by using visible active photocatalyst. Accordingly, the present disclosure is directed to novel BiOS, BiOP as visible active photocatalysts, which have been shown to be effective for photocatalytic remediation of pharmaceutical pollutants, particularly ciprofloxacin hydrochloride and Naproxen and dye such as orange dye from wastewater using artificial radiation or solar radiation.

EMBODIMENTS OF THE INVENTION

Embodiments of the invention include providing:

a novel visible active photocatalyst of formula BiOX wherein X=P or S;

a process for the preparation of novel visible active photocatalyst of formula BiOX wherein X=P or S by a sol-gel method;

a process for degradation of dyes, pharmaceutical compounds or both, that may be present in wastewater using novel visible active photocatalyst of formula BiOX wherein X=P or S; and a process for degradation of dyes, pharmaceutical compounds or both, that may be present in wastewater using novel visible active photocatalyst BiOX and solar radiation or artificial radiation.

SUMMARY OF THE INVENTION

Accordingly, there is provided a process and discloses novel visible active photocatalysts of formula BiOX wherein X=P or S.

In another embodiment, there is provided a process for the preparation of novel visible active photocatalyst of formula BiOX wherein X=P or S by a sol-gel method.

In another embodiment, there is provided a process for degradation of a pollutant comprising: exposing the pollutant in liquid medium in the range of 1-1000 ppm to visible light of 400-800 nm or solar radiation in the presence of the photocatalyst loading in the range of 0.1-20 g/L for 1-24 hours to obtain an equilibrium concentration of pollutants in the range of 0.5-50 ppm.

[(C/C$_{t-0}$) v/s time], (Initial concentration of CFX 100 mg/L; catalyst loading 2 g/L and lamp input rating 400 W). Definition of symbols:
- ♦ pH=3
- ■ pH=5
- ▲ pH=7
- × pH 9

Figure 6:
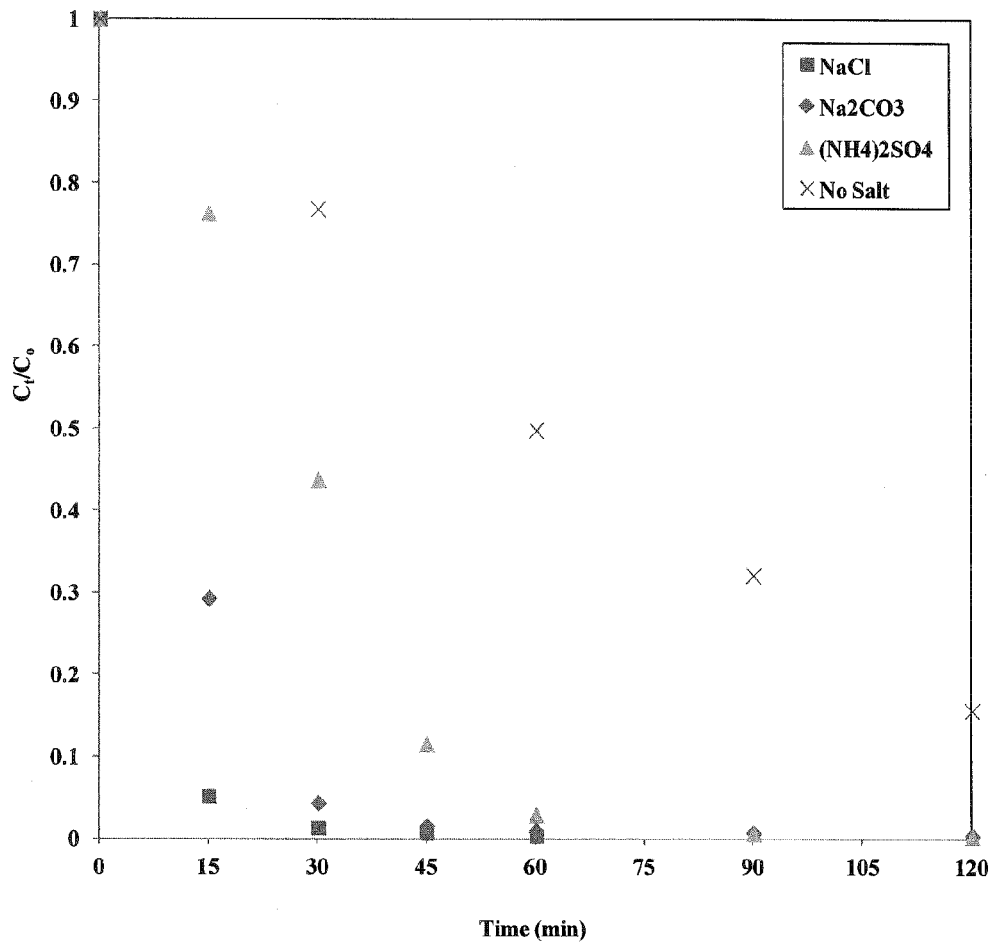

FIG. 6: PCD of CFX in the presence of co-existing ions using BIOS catalyst and artificial radiation (Initial concentration of CFX 100 mg/L; Catalyst loading 2 g/L and lamp input rating 400 W). Definition of symbols:
- ■ PCD of CFX in the presence of 500 mg L$^{-1}$ of NaCl
- ♦ PCD of CFX in the presence of 500 mg L$^{-1}$ of Na$_2$CO$_3$
- ▲ PCD of CFX in the presence of 500 mg L$^{-1}$ of (NH$_4$)$_2$SO$_4$
- × PCD of CFX in the absence of salt FIG. 7: Kinetics of PCD of CFX using BiOS photocatalyst and artificial radiation (Catalyst loading 2 g/L and lamp input rating 400 W). Definition of symbols:
- ♦ CFX concentration=50 mg/L
- ■ CFX concentration=100 mg/L
- ▲ CFX concentration=200 mg/L
- × CFX concentration for reused BiOS photocatalyst=100 mg/L FIG. 8: Langmuir-Hinshelwood kinetic model (plot of 1/R vs. 1/C$_0$) application to BiOS photocatalyst

DETAILED DESCRIPTION OF THE INVENTION

The following description provides details in connection with certain preferred and optional embodiments, so that various aspects of the invention may be more fully understood and appreciated.

In an embodiment, the present invention provides a novel visible active photocatalyst of formula BiOX wherein X=P or S wherein the catalyst is prepared by sol gel method.

In preferred embodiment, the novel visible active photocatalyst is selected from BiOS or BiOP.

In a preferred embodiment, the novel visible active photocatalysts of the present invention is used for removal of pharmaceutical pollutants such as naproxen, ciprofloxacin hydrochloride and dyes such as orange dye from wastewater or other water sources.

The novel visible active photocatalysts of the present invention may be used for removal from wastewater and other water sources of pharmaceutical pollutants selected from the group consisting of: amoxicillin, azithromycin, bacitracin, ciprofloxacin hydrochloride, doxycycline, erythromycin, lincomycin, naproxen, penicillin G, penicillin V, sulfadiazine, sulfamethizole, sulfamethoxazole, tetracycline, trimethoprim, diclofenac, carbamazepine, atenolol, bezafibrate, lidocaine, clarithromycin, paracetamol, diatrizoate, iopamidol, iopromide, cyclophosphamide and ifosfamide.

The novel visible active photocatalysts of the present invention may be used for removal of dye pollutants selected from the group consisting of Alizarin, Bismarck brown Y, Brilliant cresyl blue, Congo red, Crystal violet, Janus green, Lissamine fast yellow, Martius yellow, Meldola blue, Metanil yellow, Methyl orange, Methyl red, Naphthalene black 12B, Naphthol green B, Naphthol yellow S, Orange G, Rose Bengal, Sudan II, Titan yellow, Victoria blue 4R, Victoria blue B, Victoria blue R.

In another embodiment, the a process is provided for the preparation of novel visible active photocatalyst of formula BiOX wherein X=P or S, wherein the catalyst is prepared by sol gel method comprising the steps of:
(a) adding bismuth (III) oxide to ethanol to form a mixture;
(b) stirring mixture of step (a) followed by addition of concentrated sulfuric acid or phosphoric acid at 40° C.;
(c) sonicating the reaction mixture of step (b) for 1 hour; and
(d) calcining the product of step (c) at 500° C. for 12 hrs to produce desired photocatalyst.

In a preferred embodiment, the product of step (c) is washed with ethanol or deionized water or alternately with both and dried in a vacuum oven prior to calcining. In a further preferred embodiment, the process for the preparation of novel visible active photocatalyst the ratio of bismuth (III) oxide to ethanol is 1:10 and in a further preferred embodiment the ratio of ethanol to sulfuric acid is 2:1.

The photocatalytic activity of the BiOS photocatalyst has been studied under different operating conditions such as initial concentration of ciprofloxacin HCl, pH of solution and effect of presence of co-existing ions on PCD of ciprofloxacin HCl has been studied in details and an optimum condition has been established. From the experimental study it was found that the rate of reaction is greatly affected by these parameters. From the Langmuir-Hinshelwood kinetic modelling it was found that the PCD of ciprofloxacin HCl follows the pseudo-first order reaction. Similar experiments were conducted for studying the photocatalytic degradation of orange dye using BiOS photocatalyst using artificial radiation while photocatalytic degradation of naproxen was studied under solar radiation, using BiOS and BiOP photocatalyst.

Figure 3:
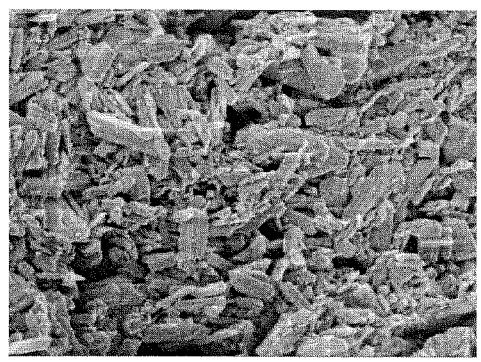
FIG. 3: (a) E-SEM image of BiOS photocatalyst showing elongated tetragonal particles. (b) Diffusive reflectance spectra by using UV-visible spectrometer. (c) XRD pattern for BiOS visible active photocatalyst sample.
Figure 3:
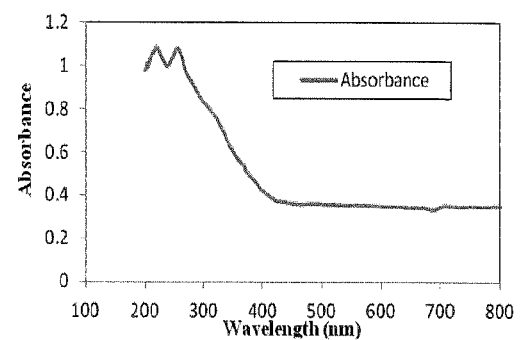
Figure 3:
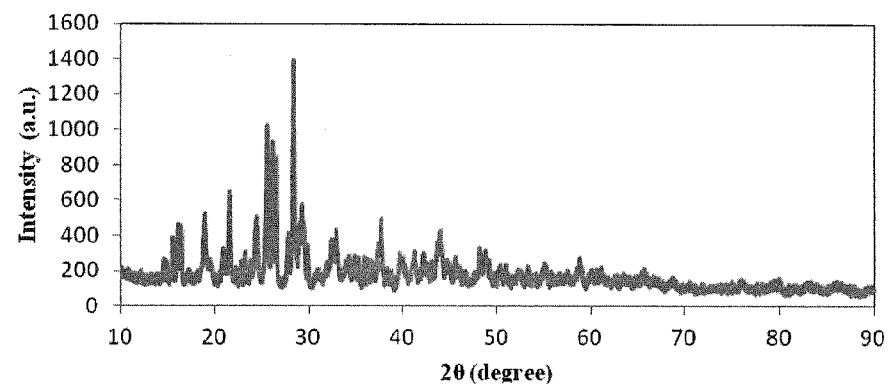

The elemental analysis of prepared BiOS photocatalyst was done by using Energy Dispersive X-Ray Analyzer (EDAX) which showed that the catalyst contains 56% of Bi, 32.5% of O$_2$ and 11.5% S. The resolution of EDAX was 130 eV and the standards used were Al & Cu. The morphology of the particles is analyzed by scanning electron microscope FEI make Dual Beam Quanta 200 3D ESEM modal. The electron source used was thermionic emission with tungsten filament with resolution of 3 nm at 30 KV. It is found that the shape of the particles is similar to that of regular geometrical shape of elongated tetragonal geometry. The E-SEM analysis showed that the particle size varied from 80 nm to 240 nm; as shown in Figure (a). A diffusive reflectance spectrum was also obtained for the dry-pressed disk sample using a UV-visible spectrometer. The instrument used was Jasco V500 and the absorbance was measured in diffuse reflectance mode. The spectrum proved that the catalyst is visibly active and absorbs the light in visible region spectra as well as in UV region spectra as shown in FIG. 3 (b). Physical properties of the BiOS Photo catalyst have been studied by using Quantachrome autosorb Automated Gas Sorption System.

According to BET theory concluded the surface area of the catalyst was calculated to be 110.2 m$^2$/g. Further analysis showed that the photocatalyst has an average pore size of 3.95 nm and an average pore volume of 0.1091 cm$^3$/g. The polycrystalline nature of BiOS photocatalyst was determined by powder X-ray diffraction (XRD) with Cu, K$_\alpha$ radiations (FIG. 3c).

In still another embodiment, the present invention provides a process for degradation of a pollutant comprising: exposing the pollutant in liquid medium in the range of 1-1000 ppm to ultraviolet or visible light of 400-800 nm in the presence of the photocatalyst loading in the range of 0.1-20 g/L for 1-24 hours to obtain the equilibrium concentration of pollutants in the range of 0.5-50 ppm.

In preferred embodiment, the process of degradation is carried out at pH in the range of 3 to 7, preferably carried out at pH 7.

In another preferred embodiment, the process of degradation of a pollutant optionally comprises addition of salts such as sodium hydroxide, sodium carbonate, sodium bicarbonate, ferrous sulphate, copper sulphate, sodium chloride and ammonium sulphate.

In still another preferred embodiment, the process of degradation of pollutants as described above wherein the pollutants are ciprofloxacin hydrochloride, naproxen and orange dye.

The following examples, which include preferred embodiments, serve to illustrate the practice of the invention, it being understood that the particulars shown are by way of example and not limitation and for the purpose of illustrative discussion of preferred embodiments of the invention.

Any range of numbers recited in the specification hereinabove or in the claims hereinafter, such as that representing a particular set of properties, units of measure, conditions, physical states or percentages, is intended to literally incorporate expressly herein by reference or otherwise, any number falling within such range, including any subset of numbers or ranges subsumed within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% .... 50%, 51%, 52% .... 95%, 96%, 97%, 98%, 99%, or 100%. Moreover, any numerical range represented by any two values of R, as calculated above is also specifically disclosed.

For purposes of the present invention the following terms shall have the indicated meaning:

"Comprise" or "comprising": Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct within the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps.

EXAMPLES

Example 1

Preparation of BiOS Photocatalyst

A composite of BiOS was prepared by using sol gel method. The preparation procedure is quite simple. Initially 100 ml of absolute ethanol was taken it to the beaker. Then 10 g of bismuth (III) oxide powder was added in to the beaker containing ethanol. The ratio of bismuth oxide to ethanol was kept 1:10. The mixture was kept on magnetic stirrer and then 50 ml of concentrated sulfuric acid (98%) was added at the rate of 10 ml at the time interval of 30 min. The ratio of ethanol to sulfuric acid must be kept 2:1. The temperature of mixture was kept at 40° C. The mixture is sonicated in an ultra-sonication bath for 1 hr, after which a thick precipitate was formed. The mixture was washed alternately with ethanol and DI (deionized) water for 5 times each. The white semisolid material was dried in a vacuum oven for 24 hrs.; white crystals are formed. The crystals are crushed into fine powder which is calcined at 500° C. for 12 hrs. Thus a fine white or slightly brownish powder BiOS photocatalyst is formed. The synthesized photocatalyst was characterized w.r.t. (with reference to the use of) SEM (scanning electron microscopy), diffusive reflectance spectrum by using UV-visible Spectrometer and EDAX respectively.

A similar experimental procedure was carried used for the preparation of BiOP photocatalyst. The only difference was that phosphoric acid was used instead of sulfuric acid.

Example 2

Figure 1:
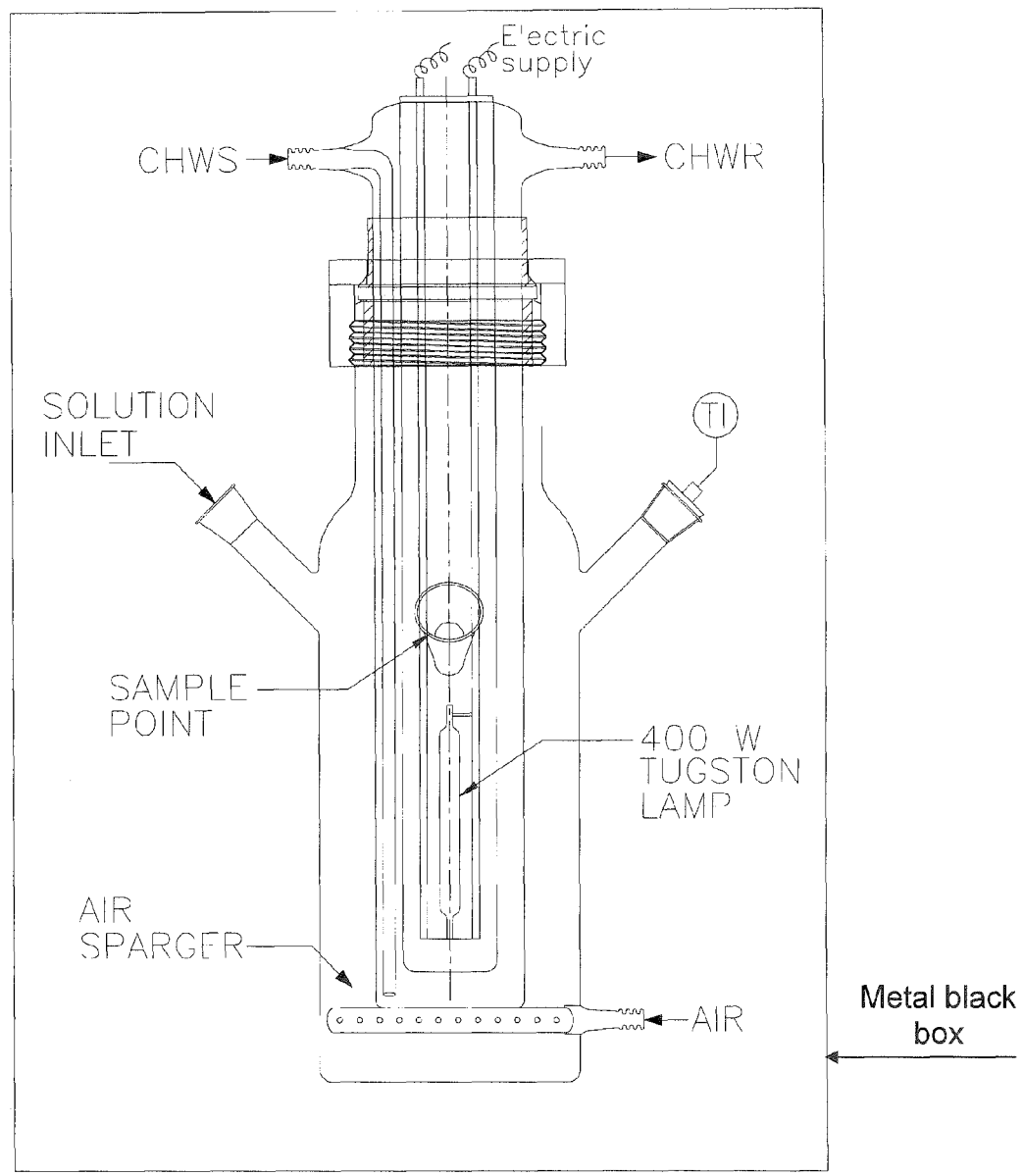
FIG. 1: Schematic diagram of photocatalytic reactor system for degradation of pollutants using artificial radiation.

Experimental Procedure for Photocatalytic Degradation of Pharmaceutical Pollutants Using Artificial and Solar Radiation An annular borosilicate glass reactor as shown in FIG. 1 was used as a photocatalytic reactor for performing the photocatalytic oxidation reaction. A visible tungsten lamp with power rating 400 watts was used as the source of artificial radiation. The whole assembly was enclosed in a metallic box painted internally and externally with black paint. De-ionized water (prepared using the Millipore Milli-Q system) was used to prepare aqueous solutions of pollutant pharmaceuticals or dyes. The temperature of reaction mixture was kept at about 25° C. by circulating chilled water through the annular space between the lamp via JULABO chiller FP-50 MA. In each experiment 500 ml of solution was charged in the reactor. An air at rate of 1 L/min required for the oxidation reaction and to keep all the BiOX in suspension was supplied via a ring sparger located at the bottom of the reactor. In the photocatalytic experiments BiOS or BiOP were used as the photocatalyst. The solution was equilibrated by stirring for 15 minutes in the dark before exposing the reactor assembly to the visible light. A sample was removed for analysis. The concentration of pollutant pharmaceuticals or dyes in the filtered sample was treated as the zero time concentration in each experiment before exposure to radiation. Then the aqueous solution pollutant pharmaceuticals or dyes was transferred to the glass reactor and the visible lamp switched on. Liquid samples were taken periodically from the reactor for analysis and stored in amber colored bottles. During the PCD experiments the pH of the solution was not controlled. The concentration of pollutant pharmaceuticals and dyes or total organic carbon (TOC) in the samples was monitored by high performance liquid chromatography (Dionex P680 HPLC) fitted with a UV detector (Dionex UVD 170U) and a C-18 column (BIS-CHOFF, C-18-5 µm particle size, 250×4.6 mm, silica gel with C18 coating) and TOC analyzer (TOC analyzer OCT-L8 sport sampler Model TOC-L-CPH, Shimadzu Corporation, Japan).

Figure 2:
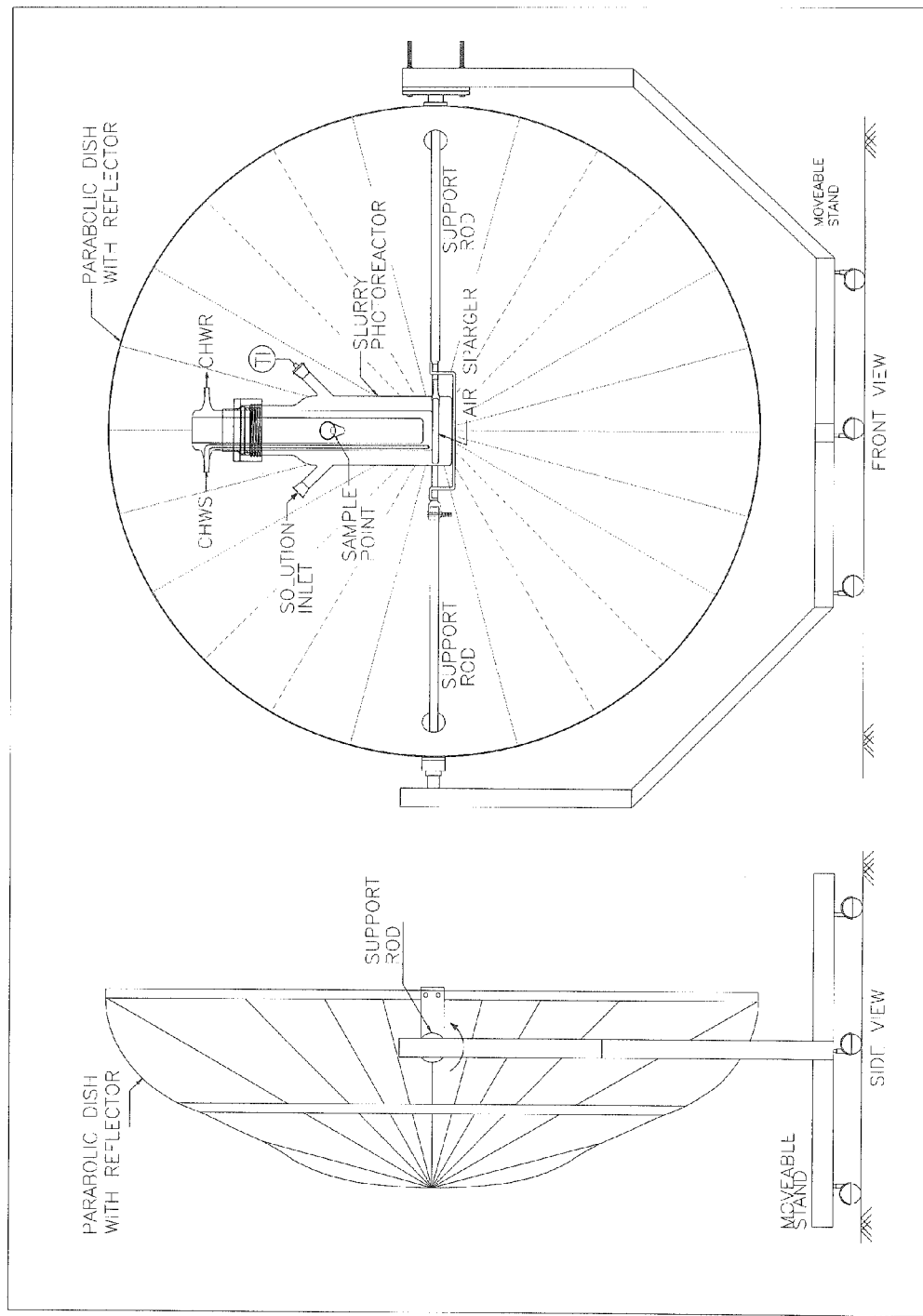
FIG. 2: Schematic diagram of photocatalytic reactor system for degradation of pollutants using solar radiation

Experimental set up used for PCD of pollutant pharmaceuticals or dyes using solar radiation is shown in FIG. 2. Similar experimental procedure was carried out for PCD of pollutant pharmaceuticals or dyes using solar radiation. A parabolic reflector having surface area of 1.5 m² was used to concentrate the solar radiation forming a continuous glowing band of concentric light surrounding the wall of the reactor. After every 20 minutes, the position of the reflector was tracked with respect to the sun so as to maintain the band of light surrounding the reactor wall. Plain solar radiation intensity was measured in W/m² by 'daystar meter' (daystar Inc, Las Cruces, N. Mex., USA) working on the photocell principle. Solar radiation intensity at ground level is referred to as plain intensity henceforth. Average solar intensity of solar irradiation was found approximately 830±10 W/m².

Example 3

BiOS Photocatalytic Degradation of Orange Dye

BiOS can also be used for PCD of orange dye in presence of artificial radiation. Following Table 1 shows the experimental conditions and result of the conducted experiment.

TABLE 1

Experimental conditions and result of photocatalytic degradation of Orange dye in presence of artificial radiation.
Experiment Conditions: Photocatalyst: BiOS;
Photocatalyst loading: 1 g/L;
Pollutant: Orange Dye, Pollutant Conc.: 50 ppm;
Source of Irradiation: Artificial Radiation;
Tungsten lamp: Power input rating = 400 W.

| Time (min) | Concentration, TOC* (ppm) |
|---|---|
| Initial | 48.5 |
| 0 | 36 |
| 60 | 28.5 |
| 120 | 24.1 |
| 180 | 20.3 |
| 240 | 17.4 |

*TOC = total organic carbon

Example 4

BiOS Photocatalytic Degradation of Naproxen

BiOS can also be used for PCD of Naproxen in presence of solar radiation. Following Table 2 shows the experimental conditions and result of the conducted experiment.

TABLE 2

Experimental conditions and result of photocatalytic degradation of Naproxen in presence of solar radiation.
Experiment Conditions: Photocatalyst: BiOS;
Photocatalyst loading: 2 g/L;
Pollutant: Naproxen, Pollutant Conc.: 50 ppm;
Source of Irradiation: Solar radiation,
Solar intensity: 830 W/m$^2$.

| Time (min) | Concentration, TOC (ppm) |
|---|---|
| Initial | 42.86 |
| 0 | 29.03 |
| 15 | 28.5 |
| 30 | 27.89 |
| 60 | 27.1 |
| 90 | 26.3 |
| 120 | 20.91 |

Example 5

BiOP Photocatalytic Degradation of Naproxen

Similarly, replacing sulfur, S, of BiOS by phosphorus, P, as described above, another photocatalyst identified as BiOP can be formed. Primary experiment of photocatalytic degradation of Naproxen using BiOP was conducted. Following Table 3 shows the experimental conditions and result of the experiment.

TABLE 3

Experimental conditions and result of photocatalytic degradation of Naproxen in presence of solar radiations using BiOP photocatalyst.
Experiment Conditions: Photocatalyst: BiOP;
Photocatalyst loading: 4 g/L;
Pollutant: Naproxen, Pollutant Conc.: 50 ppm;
Source of Irradiation: Solar Radiation;
Solar intensity: 840 W/m$^2$.

| Time (min) | Concentration, TOC (ppm) |
|---|---|
| Initial | 55.17 |
| 0 | 37.38 |
| 30 | 36.40 |
| 60 | 31.65 |
| 120 | 27.78 |
| 180 | 21.43 |
| 240 | 16.55 |

Example 6

Figure 4:
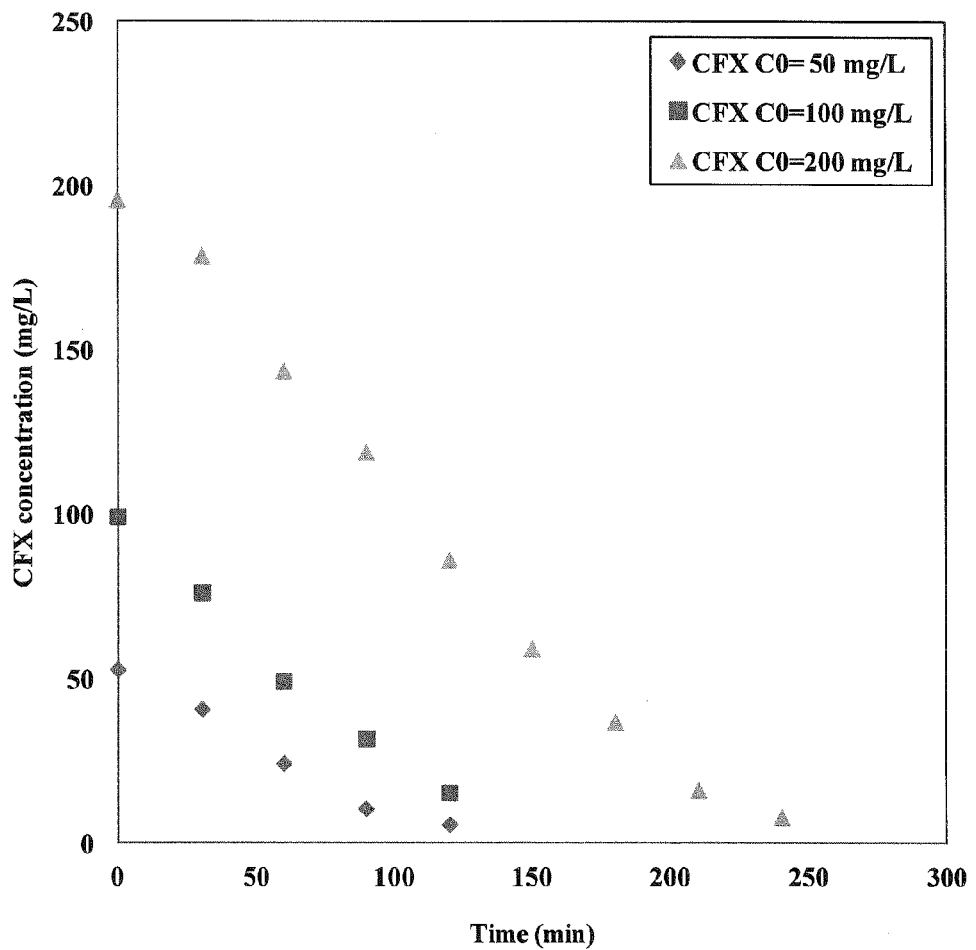
FIG. 4: Effect of different initial concentration of CFX on PCD using BiOS photocatalyst and artificial radiation (catalyst loading 2 g/L and lamp input rating 400 W). Definition of symbols:
♦ Initial CFX concentration=50 mg/L
■ Initial CFX concentration=100 mg/L
▲ Initial CFX concentration=200 mg/L

Photocatalytic Degradation of Ciprofloxacin HCl (CFX) Using Visible Active BiOS Catalyst and Artificial Radiation A. Effect of Initial Concentration of Ciprofloxacin HCl Photocatalytic oxidation of CFX was conducted for CFX concentrationa ranging from 50-200 mg/L, while photocatalyst loading 2 g/L, reaction time and lamp input rating (400 W) were kept constant. Table 4 shows the effect of initial concentration of CFX on rate of PCD. It was found that the complete degradation of CFX was achieved under artificial radiation for initial concentrations up to 100 mg/L within 2 hr (Table 4). The concentration of CFX has a significant effect on the degradation rate. FIG. 4 also clearly shows that the time required for complete degradation of CFX increases with increase in initial CFX concentration. Although not wishing to be bound by theory, it is believed that this can be explained on the basis that the initial lower concentration of CFX solution and a certain BiOS loading, the amount of active centers on the photocatalyst was finite and hence the PCD rate was fast. The PCD rate decreases when the concentration of CFX increases, possibly because the number of molecules of CFX were in excess as compared to the amount of active centers on the photocatalyst.

TABLE 4

Effect of initial concentration of ciprofloxacin HCl on photocatalytic activity of BiOS (Experimental conditions: catalyst loading 2 g/L and lamp input rating 400 W).

| | C/Co | | | |
|---|---|---|---|---|
| Time (min) | 50 mg/L | 100 mg/L | 200 mg/L | 100 mg/L (Re-used) |
| 0 | 1 | 1 | 1 | 1 |
| 30 | 0.774 | 0.768 | 0.913 | 0.793 |
| 60 | 0.463 | 0.498 | 0.734 | 0.495 |
| 90 | 0.203 | 0.321 | 0.608 | 0.349 |
| 120 | 0.112 | 0.156 | 0.441 | 0.245 |
| 150 | ND | ND | 0.303 | ND |
| 180 | ND | ND | 0.190 | ND |
| 210 | ND | ND | 0.084 | ND |
| 240 | ND | ND | 0.041 | ND |

Notes:
C/Co = concentration/initial concentration; ND: Not Detectable (below detection limit)

B. Effect of pH

Figure 5:
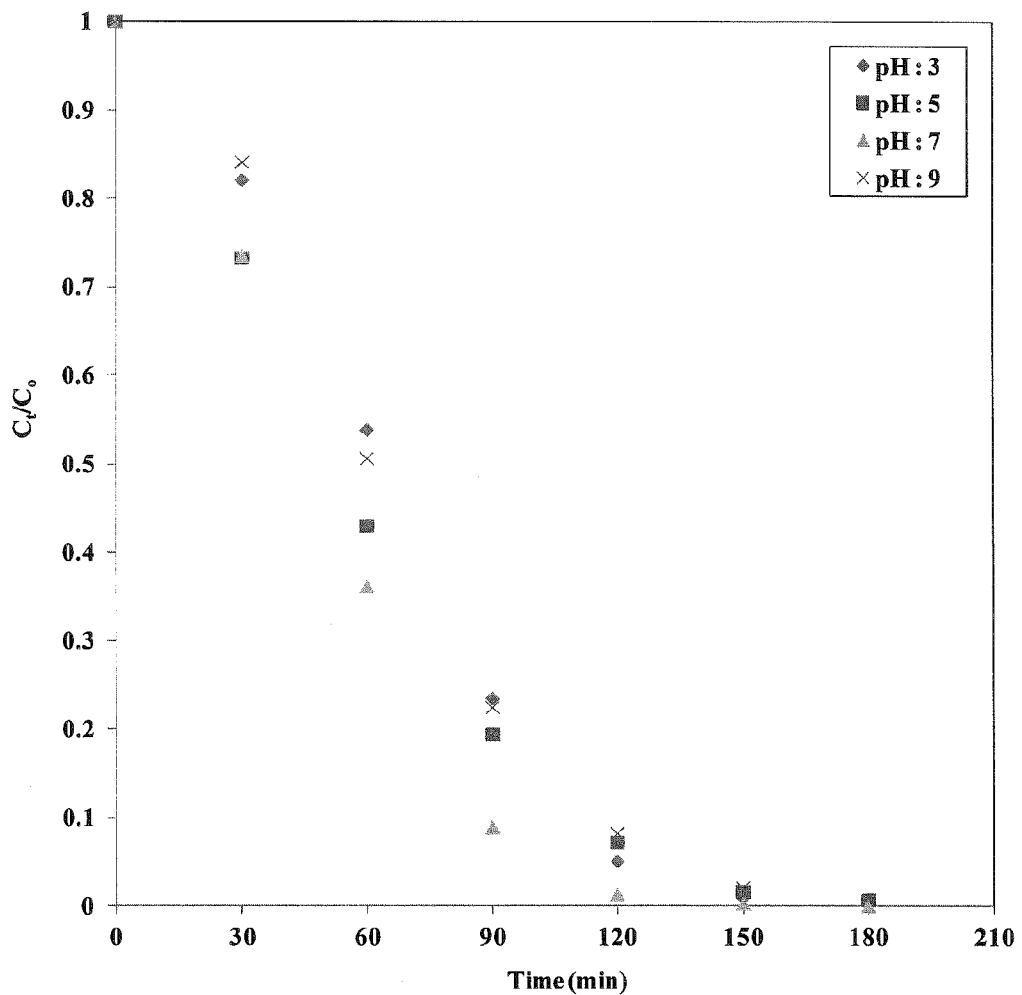
FIG. 5: Effect of pH on the photocatalytic degradation of CFX on using BiOS photocatalyst and artificial radiation

Generally, one of the important parameters which needs to be considered while treating wastewater is its pH. The pH certainly affects the photocatalytic activity of the photocatalyst and subsequently the rate of PCD. The PCD of CFX not only depends on BiOS concentration but also on the pH of the CFX solution, since pH determines the surface charge properties of the photocatalyst and therefore the adsorption behavior of the organic substrate. In the present work, the influence of pH on the degradation of CFX in aqueous suspensions of BiOS was studied at pH ranging from 3 to 9. Table 5 shows dimensionless concentration of CFX ($C/C_O$) with respect to time at different pH. The pH values were adjusted by adding aqueous solutions of 0.1 N HCl and 0.1 N NaOH to get a desired pH value, while initial CFX concentration of 100 mg/L and catalyst loading of 2 gm/L were kept constant. The maximum degradation of CFX was observed at neutral pH (pH 7) than those of highly acidic (pH 3) and alkaline (pH 9) conditions (FIG. 5). This study shows that the rate of degradation of CFX is significantly influenced by the pH of the reaction solution. The BiOS surface will remain positively charged in acidic medium (pH<5) and negatively charged in alkaline medium (pH>7) because under acidic condition (3 pH), CFX is positively charged which is same as BiOS surface resulting in repulsion between them. On the other hand, both BiOS and CFX are negatively charged under basic conditions (pH 9) leading to the same phenomenon of repulsion between them and lower rate of reaction.

TABLE 5

Effect of pH of solution on photocatalytic activity of BiOs (Experimental conditions: Initial concentration of CFX 100 mg/L; catalyst loading 2 g/L and lamp input rating 400 W).

| | C/Co | | | |
|---|---|---|---|---|
| Time (min) | 3 pH | 5 pH | 7 pH | 9 pH |
| 0 | 1 | 1 | 1 | 1 |
| 30 | 0.821 | 0.733 | 0.735 | 0.842 |
| 60 | 0.539 | 0.431 | 0.362 | 0.507 |
| 90 | 0.235 | 0.195 | 0.090 | 0.225 |
| 120 | 0.052 | 0.072 | 0.014 | 0.083 |
| 150 | 0.010 | 0.017 | 0.003 | 0.021 |
| 180 | 0.006 | 0.008 | 0.001 | 0.010 |

C. Effect of Presence of Co-Existing Ions

PCD of pollutant is greatly affected by the presence of co-existing ions. The presence of certain inorganic ions in the reaction medium has a significant effect on PCD of pollutants. Effect of sodium carbonate, sodium chloride and ammonium sulphate on degradation of CFX was studied, while photocatalyst loading was kept constant (2 g/L). The PCD experiments were performed by adding 500 mg L$^{-1}$ of various salts: carbonate, chloride and sulfate ions separately in 100 mg L$^{-1}$ ciprofloxacin HCl solution. Table 6 shows the dimensionless concentration ciprofloxacin HCl ($C/C_O$) in presence of these salts. It was observed that complete degradation of ciprofloxacin HCl was achieved in 45 min, while in the absence of salts it takes 120 min (FIG. 6). For NaCl it may possible that it reacts with ciprofloxacin HCl to form other side product or it improves the adsorption of ciprofloxacin HCl on surface of BiOS. However due to the addition of NaCO$_3$ and ammonium carbonate salts into the ciprofloxacin HCl solution, the pH of the solution became neutral. From the previous results (effect of pH) it was found that that the maximum PCD of ciprofloxacin HCl is at 7 pH.

TABLE 6

Effect of co-existing ions on photocatalytic activity of BiOS (Experimental conditions: Initial concentration of CFX 100 mg/L; catalyst loading 2 g/L and lamp input rating 400 W).

| | C/Co | | | |
|---|---|---|---|---|
| Time (min) | NaCl | Na$_2$CO$_3$ | (NH$_4$)$_2$SO$_4$ | No Salt |
| 0 | 1 | 1 | 1 | 1 |
| 15 | 0.051 | 0.293 | 0.763 | 0.852 |
| 30 | 0.013 | 0.043 | 0.438 | 0.768 |
| 45 | 0.007 | 0.016 | 0.115 | 0.584 |
| 60 | 0.003 | 0.009 | 0.029 | 0.498 |
| 90 | ND | 0.0073 | 0.007 | 0.321 |
| 120 | ND | 0.004 | 0.003 | 0.156 |

Example 7

Kinetic Modeling of Photocatalytic Oxidation of CFX

In a heterogeneous photocatalytic degradation system, the Langmuir-Hinshelwood model has used predominantly to determine the relationship between the initial degradation rate and the initial concentration of the organic substrate. The kinetics of the PCD reaction is performed by varying the initial CFX concentration from 50 to 200 mg L$^{-1}$ using BiOS photocatalyst. The linearity obtained between $\ln(C_0/C)$ versus t plot indicates pseudo-first-order kinetics (FIG. 7) where $C_0$ is the initial concentration of CFX (mg L$^{-1}$) and C is the concentration of CFX (mg L$^{-1}$) at irradiation time t (min). The kinetic parameters are shown in Table 7 where the rate constants and half-lives are listed. The rate-constants, $K_{app}$ (min$^{-1}$) hence calculated (slopes of the lines) are found to decrease with increasing concentration of CFX from 0.0177 min$^{-1}$ (for 50 mg L$^{-1}$) to 0.0116 min$^{-1}$ (for 200 mg L$^{-1}$). This can be a result of reducing the interaction of photons with these sites. Half lives are about 60 min for 50-100 mg L$^{-1}$ CFX concentrations; however 200 mg L$^{-1}$ CFX concentration results in 105 min half-life.

Langmuir-Hinshelwood kinetic model is also tested for CFX by the rearranged-form of the equation (Eq. 1).

$$\frac{1}{R} = \frac{1}{kKC_0} + \frac{1}{k} \quad (1)$$

Where R is the rate of degradation, K is the adsorption coefficient of CFX onto the surface of the catalyst (L mg$^{-1}$), k is the reaction rate constant (mg L$^{-1}$ min$^{-1}$).

Figure 8:
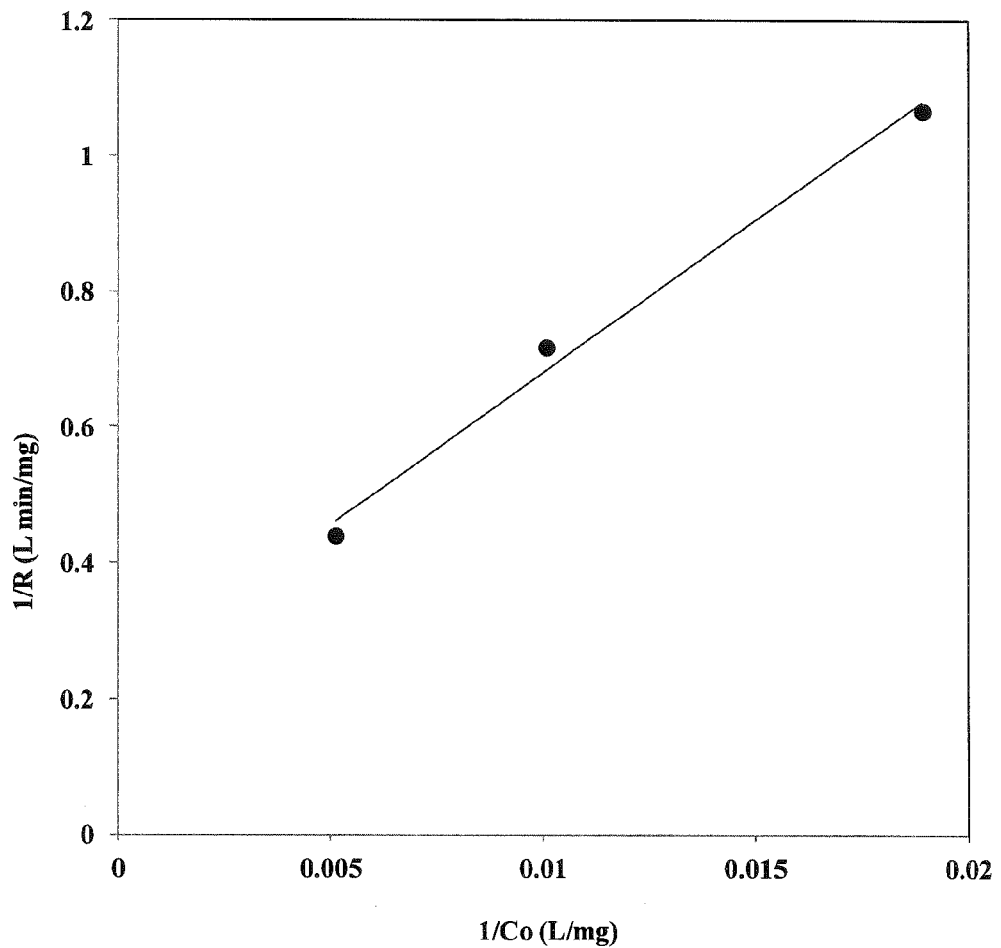

Validity of the model is confirmed by the linearity in the plot of reciprocal of rates (1/R) against reciprocal of initial CFX concentrations (1/$C_0$) (FIG. 8). The values of K and k are found to be 0.0956 L mg$^{-1}$ and 4.28 mg L$^{-1}$ min$^{-1}$.

Figure 7:
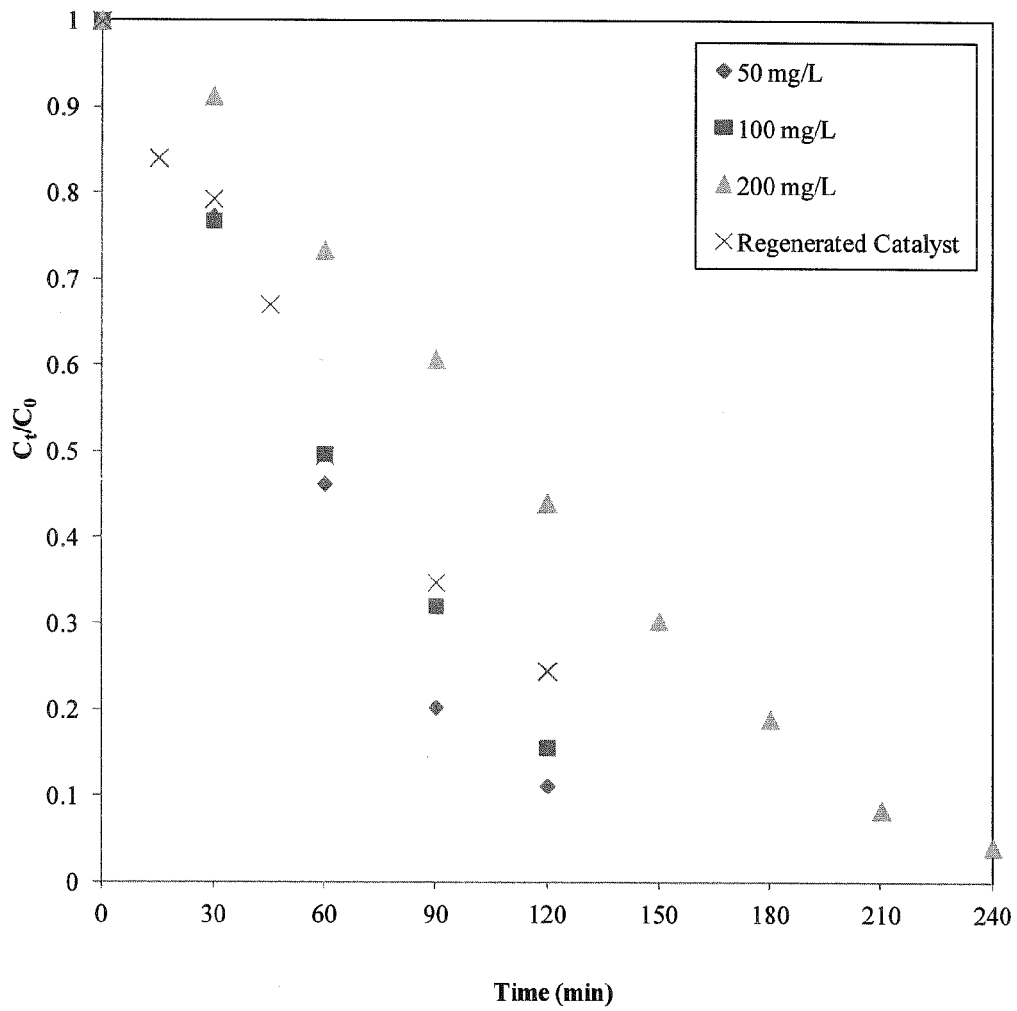

The stability of BiOS photocatalyst is examined by recycling photocatalyst (FIG. 7). After the photocatalytic degradation experiment, the photocatalyst is filtered, washed twice with water and dried at 100° C. for 2 hr. The separated and dried photocatalyst was used for the next PCD experiments by keeping other reaction conditions constant. After the first cycle, degradation percent of CFX decreases approximately from 85% to 76%, indicating that the BiOS photocatalyst is active and shows its repeatability. It can also be concluded that as the photocatalyst can be regenerated and reused, this implies that the chemical structure of BiOS which shows photocatalytic activity is intact. BiOS do not disintegrate into its individual components and do not release bismuth or sulfur in treated water. Further study is necessary on repeatability of BiOS photocatalyst. The reduction in the percentages among the cycles may be explained by the formation of by-products and their accumulation on the active surface sites of the catalyst or by the loss of the photocatalysts during each collection and rinsing steps.

TABLE 7

Kinetic parameters at different initial concentrations of CFX in presence of BiOS photocatalyst.

| Initial concentration CFX (mg/L) | $R^2$ | $K_{app}$ (min$^{-1}$) | $t_{1/2}$ (min) |
|---|---|---|---|
| 50 mg/L | 0.976 | 0.0177 | 60 |
| 100 mg/L | 0.9635 | 0.0140 | 60 |
| 200 mg/L | 0.9392 | 0.0116 | 105 |
| 100 mg/L (reused photocatalyst) | 0.9824 | 0.0114 | 60 |

The method of making a visible active photocatalyst, the photocatalyst and method of using the photocatalyst to degrade pollutants to acceptably low levels have been disclosed and demonstrated. Advantages include:

1. Kinetics of the degradation process are fast;
2. The degradation process is cost effective and easy to operate;
3. The catalyst can be reused;
4. The degradation process is pollution free and environmentally friendly; and
5. Abundant and cheap raw materials can be used for preparing and using the photocatalyst.

All documents described herein are incorporated by reference herein, including any patent applications and/or testing procedures. The principles, preferred embodiments, and modes of operation of the present invention have been described in the foregoing specification.

I claim:

1. A visible active photocatalyst active in the visible and UV regions of the electromagnetic spectrum, of formula BiOX wherein X=P or S, said catalyst active for degradation of an organic compound.

2. The visible active photocatalyst according to claim 1, wherein the photocatalyst is selected from the group consisting of BiOS and BiOP.

3. The visible active photocatalyst according to claim 1 in porous particle form.

4. The visible active photocatalyst according to claim 3, wherein the photocatalyst is BiOS particles having a size in the range of from 80 nm to 240 nm, and a surface area in the range of 100 to 110.2 m$^2$/g.

5. The visible active photocatalyst according to claim 3, wherein a BiOS photocatalyst has an average pore size of 3.95 nm and an average pore volume of 0.109 cm$^3$/g.

6. A process for the preparation of visible active photocatalyst active in the visible and UV regions of the electromagnetic spectrum, of formula BiOX wherein X=P or S, said process comprising steps of:

(a) adding bismuth (III) oxide to ethanol to form a mixture;
(b) stirring the mixture of step (a) and adding concentrated sulfuric acid or phosphoric acid at 40° C. to form a reaction mixture;
(c) sonicating the reaction mixture of step (b) for 1 hr; and
(d) calcining the sonicated product of (c) at 500° C. for 12 hrs. to produce the photocatalyst.

7. The process of claim 6 wherein the product of step (c) is washed with ethanol or deionized water or alternately with ethanol and with deionized water and vacuum dried before calcination.

8. A process of degrading at least one organic pollutant comprising: exposing the pollutant in liquid medium, the pollutant in a concentration range of 1-1000 ppm, to visible light of 400-800 nm wavelength in the presence of a photocatalyst of formula BiOX wherein X=P or S, said photocatalyst in a concentration range of 0.1-20 g/L for 1-24 hours to obtain a residual equilibrium concentration of pollutant in the range of 0.5-50 ppm.

9. The process of degradation according to claim 8, wherein the process is carried out at pH in the range of 3 to 7.

10. The process of degradation according to claim 9 conducted at pH 7.

11. The process of degradation of a pollutant according to claim 8, wherein said process comprises addition of at least one salt selected from the group consisting of sodium hydroxide, sodium carbonate, sodium bicarbonate, ferrous sulphate, copper sulphate, sodium chloride and ammonium sulphate.

12. The process of degradation of the pollutant according to claim 8, wherein said pollutant is selected from the group consisting of a pharmaceutical compound and a dye.

13. The process of degradation of the pollutant according to claim 12, wherein said pharmaceutical pollutant is selected from the group consisting of amoxicillin, azithromycin, bacitracin, ciprofloxacin hydrochloride, doxycycline, erythromycin, lincomycin, naproxen, penicillin G, penicillin V, sulfadiazine, sulfamethizole, sulfamethoxazole, tetracycline, trimethoprim, diclofenac, carbamazepine, atenolol, bezafibrate, lidocaine, clarithromycin, paracetamol, diatrizoate, iopamidol, iopromide, cyclophosphamide and ifosfamide.

14. The process of degradation of the pollutant according to claim 13, wherein said pharmaceutical pollutant is ciprofloxacin hydrochloride or naproxen.

15. The process of degradation of a pollutant according to claim 12, where in the dye is selected from the group consisting of Alizarin, Bismarck brown Y, Brilliant cresyl blue, Congo red, Crystal violet, Janus green, Lissamine fast yellow, Martius yellow, Meldola blue, Metanil yellow, Methyl orange, Methyl red, Naphthalene black 12B, Naphthol green B, Naphthol yellow S, Orange G, Rose Bengal, Sudan II, Titan yellow, Victoria blue 4R, Victoria blue B, and Victoria blue R.

16. The process of degradation of a pollutant according to claim 15 wherein the dye is an orange dye.

17. The process of degradation of an organic pollutant according to claim 8, wherein the visible light source is solar radiation or artificial radiation.

* * * * *